United States Patent [19]

Sejpal

[11] 4,188,412

[45] Feb. 12, 1980

[54] NON-FOAMING, CLEAR, AEROSOL VEGETABLE OIL COMPOSITIONS CONTAINING LECITHIN, ETHYL ALCOHOL AND HYDROCARBON PROPELLENTS

[75] Inventor: Vasant D. Sejpal, Jersey City, N.J.

[73] Assignee: American Home Products Corporation, New York, N.Y.

[21] Appl. No.: 910,701

[22] Filed: May 30, 1978

[51] Int. Cl.$^2$ .............................................. A23J 7/02
[52] U.S. Cl. .................................. 426/609; 426/662; 426/811
[58] Field of Search ............... 426/116, 601, 609, 662, 426/811

[56] References Cited

U.S. PATENT DOCUMENTS

| | | | |
|---|---|---|---|
| 2,849,323 | 8/1958 | Young | 426/116 |
| 2,963,372 | 12/1960 | Brody et al. | 426/609 |
| 3,490,923 | 1/1970 | Eiseman | 426/116 |

FOREIGN PATENT DOCUMENTS

| | | | |
|---|---|---|---|
| 241513 | 11/1962 | Australia | 426/116 |
| 590011 | 1/1960 | Canada | 426/662 |
| 1449272 | 9/1976 | United Kingdom | 426/116 |

*Primary Examiner*—Robert A. Yoncoskie
*Attorney, Agent, or Firm*—Joseph M. Weigman

[57] ABSTRACT

The inclusion of 7.5 to 25 percent by weight of ethyl alcohol (190°–200° proof) in lecithin-vegetable oil and hydrocarbon propellent compositions lowers the viscosity, provides a uniform one phase system, and renders high concentrations of lecithin compositions suitable for dispensing from aerosol containers in a clear, non-foamy form. Such compositions which contain relatively higher concentrations of lecithin may be used by the consumer in proportionally lesser amounts to achieve the same anti-stick properties or basting properties associated with the presently available products containing lower lecithin concentrations.

13 Claims, No Drawings

NON-FOAMING, CLEAR, AEROSOL VEGETABLE OIL COMPOSITIONS CONTAINING LECITHIN, ETHYL ALCOHOL AND HYDROCARBON PROPELLENTS

This invention relates to vegetable oil compositions containing lecithin. More particularly it relates to vegetable oil-lecithin compositions which are suitable for dispensing from aerosol containers in a clear, non-foamy spray, form.

It is an object of the present invention to provide a clear, non-foamy, lecithin-vegetable oil composition which is suitable for dispensing in an aerosol, spray type container, utilizing a hydrocarbon propellent.

It is another object of the present invention to provide clear, non-foamy formulations containing lecithin, vegetable oil, and ethanol, in a fluorocarbon-free propellent system formulation.

It is another object of the present invention to provide a uniform, one phase system of vegetable oil, lecithin, ethanol and propellent mixture which is suitable for dispensing from an aerosol type container in a clear, non-foamy form.

It is a further object of the present invention to provide an anti-stick lecithin-vegetable oil composition which has higher anti-stick properties per unit weight than prior art formulations.

The objects of the present invention may be achieved with a product formulation which contains 7.5 to 25 percent by weight of ethyl alcohol and 10 to 75 percent by weight of a hydrocarbon propellent along with lecithin in a vegetable oil mixture. The ethyl alcohol, for the purposes of this invention is ethanol of 190° and 200° proof which conforms with United States Pharmacopoeia (U.S.P.) standards for Alcohol and Dehydrated Alcohol, respectively. The 190° proof to 200° proof (absolute) ethanols are staple articles of commerce and are available, for instance, from U.S. Industrial Chemical Co. Ethanol of 200 U.S. proof degrees at 60° F. has a specific gravity of 0.79365, is 100 percent by weight of ethyl alcohol and contains no water. Ethanol of 190 U.S. proof degrees at 60° F. has a specific gravity of 0.81582, is 92.423 percent by weight of ethyl alcohol and contains 7.577 percent by weight of water. The 190° proof ethanol may be made by mixing 95 parts by volume of ethyl alcohol with 6.18 parts by volume of water. A shrinkage of volume occurs by mixing and results in 100 parts of 190° proof ethanol. Ethyl alcohol proof, by legal definition, is twice the percent by volume.

Ethyl alcohol denatured with a GRAS classified food grade denaturant, as for example S.D.A. 29-3, can be used in the practice of the invention. S.D.A. 29-3 contains 99% ethyl alcohol and 1% ethyl acetate as denaturant. Ethyl acetate has been classified by FDA as Generally Recognized as safe (GRAS). Substitution of SDA 29-3 alcohol, therefore, will also result in a food grade product.

It has been found that the presence of 7.5 to 25 percent of ethyl alcohol reduces the viscosity of a vegetable oil, lecithin and hydrocarbon propellent mixture, provides a uniform, one phase system, and delivers a clear, non-foamy product from an aerosol container. The phosphatides solids in lecithin have a higher specific gravity than vegetable oil, and upon prolonged standing (1 to 2 weeks) tend to separate out on the container bottom, in the absence of ethyl alcohol or a hydrocarbon propellent. The mixture of lecithin, vegetable oil and a hydrocarbon solvent provide a lower viscosity, clear solution. Such a solution, however, when dispensed from an aerosol container has undesirable foamy characteristics. The composition of this invention, which includes 7.5 to 25 percent ethyl alcohol in the product formulation results in non-foaming, desirable, light, clear, liquid type of characteristic.

The viscosity and solubility characteristics of various formulations of soybean oil, and 200° proof ethanol, with lecithin at 10 percent concentration were determined and are shown in Table 1. At levels of more than 15 percent alcohol the solutions are not clear.

The viscosity and solubility characteristics of various formulations of soybean oil, and hydrocarbon solvent, with lecithin at 10 percent concentration were determined and are shown in Table 2. As is shown in Table 2 clear solutions are obtained with any level of soybean oil and lecithin when dissolved in a hydrocarbon propellent.

The viscosity was determined with a Brookfield Synchroelectronic Viscosimeter model RVT using spindle #1. In the Tables all concentrations are given in percent by weight and viscosities are stated in centipoises(cps).

TABLE 1

| | FORMULATIONS CONTAINING 200° PROOF ETHYL ALCOHOL | | | | | | | | | | | | | |
|---|---|---|---|---|---|---|---|---|---|---|---|---|---|---|
| FORMULATION | 1 | 2 | 3 | 4 | 5 | 6 | 7 | 8 | 9 | 10 | 11 | 12 | 13 | 14 |
| Ingredients | | | | | | | | | | | | | | |
| Soybean oil | 100.0 | 0.0 | 90.0 | 87.5 | 85.0 | 82.5 | 80.0 | 77.5 | 75.0 | 72.5 | 70.0 | 65.0 | 60.0 | 50.0 |
| Lecithin (50% phosphatide solids) | 0.0 | 100.0 | 10.0 | 10.0 | 10.0 | 10.0 | 10.0 | 10.0 | 10.0 | 10.0 | 10.0 | 10.0 | 10.0 | 10.0 |
| 200° proof ethanol | 0.0 | 0.0 | 0.0 | 2.5 | 5.0 | 7.5 | 10.0 | 12.5 | 15.0 | 17.5 | 20.0 | 25.0 | 30.0 | 40.0 |
| TOTAL | 100.0 | 100.0 | 100.0 | 100.0 | 100.0 | 100.0 | 100.0 | 100.0 | 100.0 | 100.0 | 100.0 | 100.0 | 100.0 | 100.0 |
| Viscosity (cps) at 70° F. | 71 | 1150 | 83 | 70 | 57 | 53 | 46 | 44 | 39 | 41 | 46 | 51 | 56 | Not measurable, separates very quickly |
| Solubility characteristics at 70° F. | clear liquid | heavy viscous liquid | (a) | clear solution | clear solution | clear solution | clear solution | clear solution | (b) | (c) | (c) | (c) | (c) | (c) |

(a) Clear initially. After prolonged standing (about 2 weeks) phosphatide solids separate out on bottom. Upon shaking, solution turns cloudy.
(b) Cloudy initially. Turns clear (begin to see slight separation of alcohol on a surface).
(c) Cloudy initially. After 4-6 hours, turns less cloudy and a distinct alcohol layer appears on the surface. Upon shaking, turns cloudy.

TABLE 2

FORMULATIONS CONTAINING HYDROCARBON PROPELLENT

| FORMULATION | 15 | 16 | 17 | 18 | 19 | 20 |
|---|---|---|---|---|---|---|
| Ingredients | | | | | | |
| Soybean oil | 85.0 | 80.0 | 75.0 | 70.0 | 60.0 | 50.0 |
| Lecithin (50% phosphatide solids) | 10.0 | 10.0 | 10.0 | 10.0 | 10.0 | 10.0 |
| Hydrocarbon propellent | 5.0 | 10.0 | 15.0 | 20.0 | 30.0 | 40.0 |
| TOTAL | 100.0 | 100.0 | 100.0 | 100.0 | 100.0 | 100.0 |
| Viscosity (cps) at 70° F. | 56 | 45 | 42 | 35 | 23 | 16 |
| Solubility characteristics | clear solution | clear solution | clear solution | clear solution | clear solution | clear solution |

The product characteristics with respect to appearance in frying pan of various aerosol formulations of soybean oil, and various combinations of 200° proof ethanol and hydrocarbon propellents, with lecithin at 10 percent concentrations were determined and are shown in tables 3 thru 11. While particular hydrocarbon propellents are used for purposes of illustration, any food grade hydrocarbon propellent may be used in the practice of the invention including propane, butane, isobutane and isopentane.

TABLE 3
FORMULATIONS CONTAINING VARIOUS COMBINATIONS OF HYDROCARBON PROPELLENTS AND NO 200° PROOF ETHYL ALCOHOL

| Ingredients | 1 | 2 | 3 | 4 | 5 | 6 | 7 | 8 | 9 | 10 | 11 | 12 |
|---|---|---|---|---|---|---|---|---|---|---|---|---|
| Soybean oil | 80.0 | 75.0 | 70.0 | 65.0 | 60.0 | 50.0 | 35.0 | 20.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 | 10.0 | 10.0 | 10.0 |
| Aerosol Grade 60/40 Isobutane/Propane blend | 10.0 | 15.0 | 20.0 | 25.0 | 30.0 | 40.0 | 55.0 | 70.0 | 75.0 | 80.0 | 85.0 | 90.0 |
| TOTAL | 100.0 | 100.0 | 100.0 | 100.0 | 100.0 | 100.0 | 100.0 | 100.0 | 100.0 | 100.0 | 100.0 | 100.0 |
| Product Appearance in Frying Pan When Sprayed | thick white foamy product (Difficult to Spray) | thick white foamy product (Difficult to Spray) | thick white foamy product (Difficult to Spray) | white foamy product | whitish oily foamy product | whitish oily foamy product | oily foamy tiny droplets | oily foamy tiny droplets | oily foamy tiny droplets | oily foamy tiny droplets | clear product | clear product |

This table indicates that formulations containing more than 5% vegetable oil, but without containing any alcohol will result in a foamy product. As the quantity of vegetable oil in the formulation decreases the foaming characteristics of the product decreases.

TABLE 4

FORMULATIONS CONTAINING VARIOUS COMBINATIONS OF HYDROCARBON PROPELLENT AND 5 WEIGHT PERCENT 200° PROOF ETHYL ALCOHOL

| FORMULATION | 13 | 14 | 15 | 16 | 17 | 18 | 19 | 20 | 21 | 22 |
|---|---|---|---|---|---|---|---|---|---|---|
| Ingredients | | | | | | | | | | |
| Soybean oil | 75.0 | 70.0 | 65.0 | 60.0 | 45.0 | 30.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 | 10.0 |
| 200° proof ethanol | 5.0 | 5.0 | 5.0 | 5.0 | 5.0 | 5.0 | 5.0 | 5.0 | 5.0 | 5.0 |
| Aerosol Grade 60/40 Isobutane/Propane blend | 10.0 | 15.0 | 20.0 | 25.0 | 40.0 | 55.0 | 70.0 | 75.0 | 80.0 | 85.0 |
| TOTAL | 100.0 | 100.0 | 100.0 | 100.0 | 100.0 | 100.0 | 100.0 | 100.0 | 100.0 | 100.0 |
| Product Appearance in Frying Pan When Sprayed | thick, white foamy product (product streams) | thick, oily, white foamy product | thick, foamy product | foamy product | foamy product | oily foamy tiny droplets | oily foamy tiny droplets | oily foamy tiny droplets | clear product | clear product |

This table indicates that formulations containing more than 5% vegetable oil, but containing 5% or less alcohol will result in a foamy product. As the quantity of vegetable oil in the formulation decreases the foaming characteristics of the product decreases.

TABLE 5

FORMULATIONS CONTAINING VARIOUS COMBINATIONS OF HYDROCARBON PROPELLENT AND 7.5 WEIGHT PERCENT 200° PROOF ETHYL ALCOHOL

| FORMULATION | 23 | 24 | 25 | 26 | 27 | 28 | 29 | 30 | 31 | 32 |
|---|---|---|---|---|---|---|---|---|---|---|
| Ingredients | | | | | | | | | | |
| Soybean oil | 72.5 | 67.5 | 62.5 | 57.5 | 40.0 | 20.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 | 10.0 |
| 200° proof ethanol | 7.5 | 7.5 | 7.5 | 7.5 | 7.5 | 7.5 | 7.5 | 7.5 | 7.5 | 7.5 |
| Aerosol Grade 60/40 Isobutane/Propane blend | 10.0 | 15.0 | 20.0 | 25.0 | 42.5 | 62.5 | 67.5 | 72.5 | 77.5 | 82.5 |
| TOTAL | 100.0 | 100.0 | 100.0 | 100.0 | 100.0 | 100.0 | 100.0 | 100.0 | 100.0 | 100.0 |
| Product Appearance in Frying Pan | thick, white foamy product | oily, foamy product | oily, somewhat foamy product | oily, bubbly | oily, bubbly | oily bubbly tiny oil droplets | oily bubbly tiny oil droplets | oily bubbly tiny oil droplets | clear product | clear product |

This table indicates that formulations containing more than 5% vegetable oil and 7.5% ethyl alcohol, but containing 72.5 or less hydrocarbon propellent will result in a foamy product. As the quantity of vegetable oil in the formulation decreases the foaming characteristics of the product decreases.

TABLE 6

FORMULATIONS CONTAINING VARIOUS COMBINATIONS OF HYDROCARBON PROPELLENT AND 10 WEIGHT PERCENT 200° PROOF ETHYL ALCOHOL

| FORMULATION | 33 | 34 | 35 | 36 | 37 | 38 | 39 | 40 | 41 | 42 |
|---|---|---|---|---|---|---|---|---|---|---|
| Ingredients | | | | | | | | | | |
| Soybean oil | 70.0 | 65.0 | 60.0 | 55.0 | 40.0 | 25.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 | 10.0 |
| 200° proof ethanol | 10.0 | 10.0 | 10.0 | 10.0 | 10.0 | 10.0 | 10.0 | 10.0 | 10.0 | 10.0 |
| Aerosol Grade 60/40 Isobutane/Propane blend | 10.0 | 15.0 | 20.0 | 25.0 | 40.0 | 55.0 | 65.0 | 70.0 | 75.0 | 80.0 |
| TOTAL | 100.0 | 100.0 | 100.0 | 100.0 | 100.0 | 100.0 | 100.0 | 100.0 | 100.0 | 100.0 |
| Product Appearance in Frying Pan When Sprayed | thick, foamy foam quickly breaks | oily, slight foamy, bubbly | oily, bubbly | clear spray | clear spray | clear spray | clear spray | clear spray | clear spray | clear spray |

This table indicates that formulations containing 10% of alcohol, and 25% or more hydrocarbon propellent will result in a clear non-bubbly spray.

TABLE 7

FORMULATIONS CONTAINING VARIOUS COMBINATIONS OF HYDROCARBON PROPELLENT AND 12.5 WEIGHT PERCENT 200° PROOF ETHYL ALCOHOL

| FORMULATION | 43 | 44 | 45 | 46 | 47 | 48 | 49 | 50 | 51 | 52 |
|---|---|---|---|---|---|---|---|---|---|---|
| Ingredients | | | | | | | | | | |
| Soybean oil | 67.5 | 62.5 | 57.5 | 52.5 | 40.0 | 25.0 | 15.0 | 10.0 | 5.0 | 0.0 |
| Lecithin (50% phosphate solids) | 10.0 | 10.0 | 10.0 | 10.0 | 10.0 | 10.0 | 10.0 | 10.0 | 10.0 | 10.0 |
| 200° proof ethanol | 12.5 | 12.5 | 12.5 | 12.5 | 12.5 | 12.5 | 12.5 | 12.5 | 12.5 | 12.5 |
| Aerosol Grade 60/40 Isobutane/Propane blend | 10.0 | 15.0 | 20.0 | 25.0 | 37.5 | 52.5 | 62.5 | 67.5 | 72.5 | 77.5 |

TABLE 7-continued

FORMULATIONS CONTAINING VARIOUS COMBINATIONS OF HYDROCARBON PROPELLENT AND 12.5 WEIGHT PERCENT 200° PROOF ETHYL ALCOHOL

| FORMULATION | 43 | 44 | 45 | 46 | 47 | 48 | 49 | 50 | 51 | 52 |
|---|---|---|---|---|---|---|---|---|---|---|
| TOTAL | 100.0 | 100.0 | 100.0 | 100.0 | 100.0 | 100.0 | 100.0 | 100.0 | 100.0 | 100.0 |
| Product Appearance in Frying Pan When Sprayed | quick-breaking foams | bubbly | clear product | clear product | clear product | clear product | clear product | clear product | clear product | clear product |

This table indicates that formulations containing 12.5% alcohol, and 20% or more hydrocarbon propellent will result in a clear spray.

TABLE 8

FORMULATIONS CONTAINING VARIOUS COMBINATIONS OF HYDROCARBON PROPELLENT AND 15 WEIGHT PERCENT 200° PROOF ETHYL ALCOHOL

| FORMULATION | 53 | 54 | 55 | 56 | 57 | 58 | 59 | 60 | 61 | 62 |
|---|---|---|---|---|---|---|---|---|---|---|
| Ingredients | | | | | | | | | | |
| Soybean oil | 65.0 | 60.0 | 55.0 | 50.0 | 40.0 | 25.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 | 10.0 |
| 200° proof ethanol | 15.0 | 15.0 | 15.0 | 15.0 | 15.0 | 15.0 | 15.0 | 15.0 | 15.0 | 15.0 |
| Aerosol Grade 60/40 Isobutane/Propane blend | 10.0 | 15.0 | 20.0 | 25.0 | 35.0 | 50.0 | 60.0 | 65.0 | 70.0 | 75.0 |
| TOTAL | 100.0 | 100.0 | 100.0 | 100. | 100.0 | 100.0 | 100.0 | 100.0 | 100.0 | 100.0 |
| Product Appearance in Frying Pan when sprayed | clear, but slightly opaque | clear product [preferred formulation] | clear product | clear product | clear product | clear product | clear product | clear product | clear product | clear product |

This table indicates that formulations containing 15% alcohol, and 15% or more hydrocarbon will result in a clear spray.

TABLE 9

FORMULATIONS CONTAINING VARIOUS COMBINATIONS OF HYDROCARBON PROPELLENT AND 20 WEIGHT PERCENT 200° PROOF ETHYL ALCOHOL

| FORMULATION | 63 | 64 | 65 | 66 | 67 | 68 | 69 | 70 | 71 |
|---|---|---|---|---|---|---|---|---|---|
| Ingredients | | | | | | | | | |
| Soybean oil | 60.0 | 55.0 | 50.0 | 45.0 | 30.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 |
| 200° proof ethanol | 20.0 | 20.0 | 20.0 | 20.0 | 20.0 | 20.0 | 20.0 | 20.0 | 20.0 |
| Aerosol Grade 60/40 Isobutane/Propane blend | 10.0 | 15.0 | 20.0 | 25.0 | 40.0 | 55.0 | 60.0 | 65.0 | 70.0 |
| TOTAL | 100.0 | 100.0 | 100.0 | 100.0 | 100.0 | 100.0 | 100.0 | 100.0 | 100.0 |
| Product Appearance in Frying Pan when sprayed | sprays opaque, turns clear on standing (NOTE A) | slighty opaque | clear product | clear product | clear product | clear product | clear product | clear product | clear product |

This table indicates that formulations containing 20% alcohol, and 20% or more hydrocarbon will result in a clear spray. This table indicates change in trend compared to previous tables. (Increasing alcohol requires increased hydrocarbon propellent to maintain clear spray.)

TABLE 10

FORMULATIONS CONTAINING VARIOUS COMBINATIONS OF HYDROCARBON PROPELLENT AND 25 WEIGHT PERCENT 200° PROOF ETHYL ALCOHOL

| FORMULATION | 72 | 73 | 74 | 75 | 76 | 77 | 78 | 79 | 80 |
|---|---|---|---|---|---|---|---|---|---|
| Ingredients | | | | | | | | | |
| Soybean oil | 55.0 | 50.0 | 45.0 | 40.0 | 30.0 | 15.0 | 10.0 | 5.0 | 0.0 |
| Lecithin (50% phosphatide solids) | 10.0 | 10.0 | 10.0 | 10.0 | 10.0 | 10.0 | 10.0 | 10.0 | 10.0 |
| 200° proof ethanol | 25.0 | 25.0 | 25.0 | 25.0 | 25.0 | 25.0 | 25.0 | 25.0 | 25.0 |
| Aerosol Grade 60/40 Isobutane/Propane blend | 10.0 | 15.0 | 20.0 | 25.0 | 35.0 | 50.0 | 55.0 | 60.0 | 65.0 |
| TOTAL | 100.0 | 100.0 | 100.0 | 100.0 | 100.0 | 100.0 | 100.0 | 100.0 | 100.0 |
| Product Appearance in Frying Pan when sprayed | sprays opaque, clear on standing (NOTE A) | sprays opaque clear on standing (NOTE A) | sprays clear, becomes opaque as propellent evaporates, clears on standing | clear product becomes opaque as propellent evaporates | spray clear becomes opaque as propellent evaporates | sprays opaque | spray opaque | clear product | clear product |

TABLE 10-continued

FORMULATIONS CONTAINING VARIOUS COMBINATIONS OF HYDROCARBON PROPELLENT AND 25 WEIGHT PERCENT 200° PROOF ETHYL ALCOHOL

| FORMULATION | 72 | 73 | 74 | 75 | 76 | 77 | 78 | 79 | 80 |
|---|---|---|---|---|---|---|---|---|---|
| | | | | (NOTE B) | | | | | |

This table indicates that formulations containing 25% alcohol do not indicate distinct behaviour of the clear spray initially-except where vegetable oil content is 5% or less.

TABLE 11

FORMULATIONS CONTAINING VARIOUS COMBINATIONS OF HYDROCARBON PROPELLENT AND 30 WEIGHT PERCENT 200° PROOF ETHYL ALCOHOL

| FORMULATION | 81 | 82 | 83 | 84 | 85 | 86 | 87 | 88 | 89 |
|---|---|---|---|---|---|---|---|---|---|
| Ingredients | | | | | | | | | |
| Soybean oil | 50.0 | 45.0 | 40.0 | 35.0 | 25.0 | 15.0 | 10.0 | 5.0 | 0.0 |
| Lecithin (50% phosphate solids) | 10.0 | 10.0 | 10.0 | 10.0 | 10.0 | 10.0 | 10.0 | 10.0 | 10.0 |
| 200° proof ethanol | 30.0 | 30.0 | 30.0 | 30.0 | 30.0 | 30.0 | 30.0 | 30.0 | 30.0 |
| Aerosol Grade 60/40 Isobutane/Propane blend | 10.0 | 15.0 | 20.0 | 25.0 | 35.0 | 45.0 | 50.0 | 55.0 | 60.0 |
| TOTAL | 100.0 | 100.0 | 100.0 | 100.0 | 100.0 | 100.0 | 100.0 | 100.0 | 100.0 |
| Product Appearance in Frying Pan when sprayed | sprays whitish, clear after a while (NOTE A) | sprays whitish, clear after a while (NOTE A) | sprays clear, becomes whitish as propellent evaporates, clears after a while (NOTE B) | sprays clear, becomes whitish as propellent evaporates, clears after a while (NOTE B) | milky white spray | milky white spray | milky white spray | clear spray | clear spray |

This table indicates that formulations containing 30% alcohol do not indicate distinct behaviour of a clear spray initially-except where vegetable oil content is 5% or less.
NOTE A:
The formulation concentrate of this product is a cloudy, non-clear solution. Therefore, when sprayed, product appearance is opaque or milky white. As the portion of the alcohol evaporates from the surface the product turns clear.
NOTE B:
The formulation concentrate of this product is a clear solution. Therefore, product appearance is clear on the surface after spraying. The hydrocarbon propellent evaporates much faster than the alcohol, thus giving the product an opaque appearance. As alcohol concentration on the sprayed surface decreases, the product clears.

The foregoing tables show that the incorporation of less than 7.5 percent ethyl alcohol into the system results in undesirable, foamy characteristics in the product. Ethyl alcohol incorporation between 7.5 and 20 percent into the system results in a clear spray. Ethyl alcohol incorporation between 20 and 25 percent into the system results in somewhat opaque spray. More than 25 percent ethyl alcohol incorporation into the system results in an undesirable, milky white spray.

Based upon the foregoing the critical limits of ethanol are 7.5 to 25 percent. The critical limits for the hydrocarbon propellent are 10 to 75 percent.

When the lecithin level was increased to more than 20 percent in the product, it was noticed that a slight amount of phosphatides had separated out upon prolonged standing at ambient temperature. The product formulation utilized for non-stick purposes, does not require more than 15 percent lecithin in the product. Based upon the foregoing experimentation it has been found that the critical limits for lecithin are 3 to 15 percent.

It has also been found that at vegetable oil level of 5% or less, in the formulation, the alcohol provides no significant function. Based upon this the critical limits for vegetable oil are 5 to 65 percent.

The following Table 12 illustrates the effect of moisture in the product and determines utilization of 190° proof alcohol. The following samples were prepared with various concentrations of water.

TABLE 12

EFFECT OF WATER CONTENT

| Sample No. | 90 | 91 | 92 | 93 | 94 |
|---|---|---|---|---|---|
| Ingredients | | | | | |
| Soybean oil | 60.7 | 60.5 | 60.0 | 59.0 | 56.0 |
| Lecithin (50% phosphatide solids) | 10.0 | 10.0 | 10.0 | 10.0 | 10.0 |
| 200° proof ethanol | 14.0 | 14.0 | 14.0 | 14.0 | 14.0 |
| Distilled water | 0.3 | 0.5 | 1.0 | 2.0 | 5.0 |
| Aerosol Grade 60/40 Isobutane Propane | 15.0 | 15.0 | 15.0 | 15.0 | 15.0 |
| TOTAL | 100.0 | 100.0 | 100.0 | 100.0 | 100.0 |
| Product Appearance when sprayed on a Frying Pan | clear | almost clear | slightly opaque | slightly opaque | foamy, bubbly, opaque unacceptable |

The product characteristic indicates that 190° proof alcohol can be substituted for 200° proof alcohol into the formulation. At the critical range of 7.5% to 25% 190° proof ethyl alcohol the formulation will contain 0.57% to 1.9% moisture, respectively.

Food grade lecithin is obtained from soybeans. It is a complex mixture of acetone-insoluble phosphatides which consist chiefly of phosphatidyl choline, phosphatidyl ethanolamine, phosphatidyl serine, and phosphatidyl inositol, combined with various amounts of other substances such as triglycerides, fatty acids, and carbohydrates. Refined grades of lecithin may contain any of these components in varying proportions and combinations depending on the type of fractionation used. In its oil-free form, the preponderance of triglycerides and fatty acids are removed and the product contains 90 percent or more of soy phosphatides representing all or certain fractions of the total phosphatide complex. The consistency of both natural grades and refined grades of lecithin may vary from plastic to fluid, depending upon free fatty acid and soybean oil content and the presence or absence of other diluents. Its color varies from light yellow to brown depending upon whether it is bleached or unbleached. It is odorless or has a characteristic, slight nut-like odor and a bland taste. Edible diluents, such as cocoa butter and vegetable oils, often replace soybean oil to improve functional and flavor characteristics. Lecithin is only partially soluble in water, but it readily hydrates to form emulsions. The oil-free phosphatides are soluble in fatty acids, but are practically insoluble in fixed oils. When all soy phosphatide fractions are present, lecithin is partially soluble in alcohol, and practically insoluble in acetone. The acetone-insoluble matter (phosphatides) are not less than 50 percent. The acid value is not more than 36. Benzene-insoluble matter is not more than 0.3 percent. Water is not more than 1.5 percent.

Natural lecithin is available commercially in a number of grades containing 50 to 54 percent of phosphatides dissolved in soybean oil, varying in viscosity from very fluid to plastic (heavy bodied) and may be bleached or unbleached. Hydroxylated lecithin is lecithin which has been modified to increase lecithin's hydrophilic properties and may contain 66–72 percent phosphatides. Powdered and granular lecithin is substantially free of soybean oil and is produced from natural lecithin or lecithin fractions and may contain 95 percent phosphatides.

Natural lecithin was used in obtaining the data of the foregoing tables. The applicability of the present invention to hydroxylated lecithin and powdered and granulated lecithin was also determined. The results utilizing these forms of lecithin were substantially identical with the results of natural lecithin. This indicates that hydroxylated lecithin and powdered lecithin can be utilized with the present invention as well as natural fluid lecithin.

The formulations of the present invention make use up to 3 times or more the concentration of lecithin found in the currently marketed lecithin-vegetable oil products. The preferred serving portion size of the product is about one gram as compared to the serving size of about four grams for the currently marketed lecithin-vegetable oil products. The serving size of one gram of the product provides the same anti-stick properties as is found in the much larger serving size of the prior art lecithin-vegetable oil products.

The product of the present invention as discharged from an aerosol container is a water clear solution of tiny oil droplets with a light, pleasant, sweet odor. The formulation does not require any flavor, color, or preservatives system, but such a system may be added if desired. The minute oil droplet type coating affords the consumer the aesthetic property of being able to see the quantity of sprayed coating on the cooking surface. Each serving portion of one gram of the present invention contains about 0.075 to 0.25 (preferably 0.10 to 0.15 gram) grams of ethanol which is rapidly dissipated upon heating, for instance, at a 173° F. or above (B.P. of alcohol), on the coated cooking surface, leaving the film of a vegetable oil-lecithin mixture. When preheating is not practical, such as on muffin tins, most of the alcohol is dissipated by high oven heat. Foods prepared using the present product in the majority of cases would not contain any alcohol when cooked according to the baking and frying procedures ordinarily in use. The present product is a 100 percent food product and can be used for pan coating as well as for direct spraying of foods for basting.

EXAMPLE I

This example describes the preferred formulation for the present invention.

| Ingredients | Preferred Aerosol Spray Formulation In Percent By Weight | Operable Range Percent By Weight |
|---|---|---|
| Liquid vegetable oil | 60.0 | 5–65 |
| Lecithin (50% phosphatides) | 10.0 | 3–15 |
| Ethyl Alcohol | 15.0 | 7.5–25 |
| 60/40 Isobutane/Propane blend | 15.0 | 10–75 |
| TOTAL | 100.0 | |

The liquid vegetable oil may be soybean oil, corn oil, cottonseed oil, peanut oil, safflower oil, olive oil, sesame oil, peanut oil, coconut oil, coconut butter, palm nut and other fruit pit oils, glyceryl esters of lauric, linoleic, oleic, linolenic acids including their lightly hydrogenated derivatives, and the like. Vegetable oil in the formulation may contain FDA approved anti-oxidants, such as BHA (butylated hydroxyanisole), propyl gallate, and TBHQ (tertiary-butylhydroxyquinone) and may also contain a crystal inhibitor, such as oxystearin, and an anti-foam agent, such as methyl silicone.

EXAMPLE II

This example describes the efficacy testing of the formulations of Example I. The results to the efficacy testing indicated that the product is at parity on anti-stick qualities with the current market products. The test was conducted to compare the preferred formulation of Example I with PAM, a popular aerosol vegetable oil containing lecithin, for preventing sticking in casseroles and the like.

A clean, dry, cool Pyrex casserole was sprayed with PAM for three seconds in accord with label directions. A second casserole was sprayed and coated with the Example I preferred formulation (1.0 gm. serving size 2.5 seconds spray) and a third casserole was not treated in any way. The same quantity of beef stew was placed into each casserole. A pie crust was prepared and placed on top of the beef stew. The uncooked crust was then pressed against the edge of the casserole. The three casseroles were placed in a freezer and left there for one day. The casseroles were then heated at 350° F. for 60 minutes in a gas oven. After the casseroles were heated, a panel of five persons observed the serving of the beef pot pie from all three casseroles. Ease of cleaning was also noted by the same panelists. This test was run in duplicate.

The above test was repeated using chicken tetrazzini which was cooked, placed in the respective casseroles and then frozen as before. The casseroles were then reheated at 350° F. for 60 minutes and evaluated as with the beef pot pie. This test was also run in duplicate.

In a third part of the test, a prepared macaroni and cheese (Kraft) was cooked following the label cooking directions. The macaroni and cheese was then placed in the respective casseroles and frozen as above. The next day, the casseroles were reheated at 375° F. for one hour and evaluated as described above. This test was run in duplicate.

All three dishes were easily served without sticking from the casseroles treated with Example I formulation and with PAM. The casseroles were easily cleaned with a sponge and warm soapy water. The foods served easily from untreated casseroles; however, food stuck to the untreated casseroles which required scouring. Similar tests were conducted to compare the no-stick properties of the Example I formulation and PAM when eggs are fried, scrambled, shirred, poached, or cooked in an omelet. In each case, the utensil was sprayed with the formulation (1.0 gm serving size) and with PAM according to label directions. After the cooking was completed, the eggs were turned out of the utensil or removed with a spatula. In no case did the eggs stick, using either the preferred formulation or PAM.

EXAMPLE III

This example describes the nutritional content of the formulations of the present invention.

The aerosol spray formulations (example 1) consist of vegetable oil and lecithin solids which are the basis for the fat content and resulting caloric level. Experimental testing using an average size frying pan indicates that a 1.0 gram spray portion is sufficient to achieve anti-stick properties and is, therefore, the basis for determining the one gram of vegetable oil-lecithin coating per portion.

The content of calories, proteins, carbohydrates, fats and cholesterol was determined from the "Composition of Foods", Agriculture Handbook No. 8, item 1401- "Oils, Salad or Cooking".

It was found that the average spray portion contained the following:

| | |
|---|---|
| Calories | 6 |
| Protein | 0 gm |
| Carbohydrate | 0. gm |
| Fat | 0.7 gm |
| Cholesterol (0mg/100gm) | 0 gm |

It was also found that the average spray portion contains less than 2 percent of the U.S. recommended daily requirement for protein, vitamin A, vitamin C, thiamine, riboflavin, niacin, calcium and iron.

What is claimed is:

1. An edible miscible composition comprising 3 to 15 percent by weight lecithin and 7.5 to 25 percent by weight of ethyl alcohol, selected from the group consisting of absolute ethyl alcohol, 190° proof ethyl alcohol and ethyl alcohol containing a GRAS classified food grade denaturant, and 10 to 75 percent by weight hydrocarbon propellant, the remainder being at least 5 percent by weight of liquid vegetable oil.

2. The composition of claim 1 further containing an antioxidant.

3. The composition of claim 1 having a maximum moisture content of said composition of 1.9 weight percent.

4. An edible one-phase composition comprising lecithin in the amount of 10 percent by weight, ethyl alcohol selected from the group consisting of absolute ethyl alcohol, 190° proof ethyl alcohol and ethyl alcohol containing a GRAS classified food grade denaturant, in the amount of 15 percent by weight, and hydrocarbon propellent in the amount of 15 percent by weight, the remainder being at least 5 percent by weight vegetable oil.

5. An edible miscible composition comprising 3 to 15 percent by weight of lecithin and 7.5 to 20 percent ethyl alcohol, and 10 to 75 percent by weight hydrocarbon propellent, the remainder being at least 5 percent vegetable oil where the maximum water content of said composition is about 2.0 percent.

6. A clear, non-foamy, lecithin-vegetable oil composition suitable for dispensing from an aerosol, spray type container utilizing a hydrocarbon propellant comprising 7.5 to 25 percent by weight of ethyl alcohol selected from the group consisting of 190° and 200° proof ethyl alcohol and ethyl alcohol denatured with a GRAS classified food grade denaturant, 3 to 15 percent by weight of lecithin and at least 5 percent by weight of liquid vegetable oil.

7. A composition as defined in claim 6 in which the ethyl alcohol is absolute ethyl alcohol.

8. A composition as defined in claim 6 in which the ethyl alcohol contains up to 7.577 percent by weight of water.

9. A composition as defined in claim 6 in which the ethyl alcohol contains one percent by weight of ethyl acetate.

10. An anti-stick lecithin-vegetable oil composition which has higher anti-stick properties per unit weight than prior art formulation comprising 3 to 15 percent by weight lecithin, 7.5 to 25 percent by weight ethyl alcohol, at least 5 percent by weight of liquid vegetable oil and 10 to 75 percent by weight of a hydrocarbon propellent, the water content of the composition being less 2 percent.

11. An anti-stick lecithin-vegetable oil composition as defined in claim 10 which contains about ten percent by weight lecithin and about fifteen percent by weight ethyl alcohol.

12. A pan release and basting composition comprising:
A. From 3 to 15 percent by weight of a member selected from the group consisting of bleached and unbleached natural lecithin containing about 50 to 54 percent phosphatides, hydroxylated lecithin containing about 66 to 72 percent phosphatides and powdered and granular lecithin containing up to about 95 percent phosphatides;
B. From 7.5 to 25 percent by weight of an alcohol selected from the group consisting of 190° to 200° proof ethyl alcohol and ethyl alcohol denatured with a generally recognized as a safe food grade denaturant;
C. From 5 to 65 percent by weight of a liquid vegetable oil selected from the group consisting of soybean oil, corn oil, cottonseed oil, peanut oil, safflower oil, olive oil, sesame oil, peanut oil, coconut oil, coconut butter, palm nut oil and other glyceryl esters of lauric, linoleic, oleic, and linolenic acids, including their lightly hydrogenated liquid derivatives; and
D. From 10 to 75 percent by weight of a food grade hydrocarbon propellent selected from the group consisting of propane, butane, isobutane, isopentane and mixtures thereof.

13. A pan release and basting composition as defined in claim 12 further comprising one or more additives selected from the group consisting of anti-oxidants, crystal inhibitors and anti-foam agents.

* * * * *